United States Patent
Landa et al.

(10) Patent No.: US 6,605,174 B1
(45) Date of Patent: Aug. 12, 2003

(54) FOIL PRINTING

(75) Inventors: Benzion Landa, Nes-Ziona (IL); Ishaiau Lior, Rehovot (IL); Itzhak Ashkenazi, Kfar-Gibton (IL); Peretz Ben Avraham, Rehovot (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 09/890,731

(22) PCT Filed: Feb. 9, 2000

(86) PCT No.: PCT/IL00/00018
§ 371 (c)(1),
(2), (4) Date: Aug. 2, 2001

(87) PCT Pub. No.: WO01/51290
PCT Pub. Date: Jul. 19, 2001

(51) Int. Cl.$^7$ ................................. B44C 1/14
(52) U.S. Cl. .................... 156/233; 156/241; 156/277; 156/289; 156/326
(58) Field of Search ............... 156/233, 240, 156/241, 247, 277, 289

(56) References Cited

U.S. PATENT DOCUMENTS

| 5,407,771 A | 4/1995 | Landa et al. |
| 5,520,763 A | 5/1996 | Johnstone |

FOREIGN PATENT DOCUMENTS

| EP | 0 749 830 | 12/1996 |
| GB | 2 259 888 | 3/1993 |

OTHER PUBLICATIONS

Mitsubishipencil Co. Ltd.; JP 06–312573; Nov. 8, 1994 & Patent Abstracts of Japan; vol. 1995; No. 02; Mar. 31, 1995.

*Primary Examiner*—Curtis Mayes
*Assistant Examiner*—Sing P. Chan
(74) *Attorney, Agent, or Firm*—Fenster & Company

(57) ABSTRACT

A method for producing a printed image having a region that is foil printed comprising: printing at least one region of the image with a toner; printing the region of the image to be foil printed with a foiling adhesive that sticks to a foil on a printing foil, which adhesive has a melting temperature lower than the melting temperature of the toner, and pressing the printing foil to the image and heating the printing foil to a temperature greater than the melting temperature of the foiling adhesive and less than the melting temperature of the toner.

26 Claims, 3 Drawing Sheets

FOIL PRINTING

RELATED APPLICATIONS

The present application is a U.S. national application of PCT/IL00/00018, filed Jan. 9, 2000.

FIELD OF THE INVENTION

The invention relates to foil printing and in particular to transferring foil color from a foil and adhering the color to portions of an image.

BACKGROUND OF THE INVENTION

In foil printing, a colored foil bonded to a backing, hereinafter referred to as a "foil backing" is transferred from the foil backing to a substrate to form an image or parts of an image on the substrate. Hereinafter, the colored foil and its foil backing are referred to as a "printing foil". In foil printing on paper, generally, the paper is printed with a desired image using a conventional printing press and conventional printing inks. The image is then printed with an adhesive, hereinafter referred to as a "foiling adhesive", in those areas of the image to which it is desired to transfer the foil. The foiling adhesive is usually a dry toner "printed" in a xerographic process, in which the toner is bonded to the paper by fusing. A printing foil having a desired color foil is then pressed to the paper and heated. The heating causes the printed toner to melt and become tacky. The printing inks on the other hand are substantially unaffected by the heat and pressure. The foil sticks to the tacky toner but not the printed inks. When the printing foil is removed, foil detaches from the foil backing and adheres to the foiling adhesive to cover the areas of the image that it is desired to foil print. Foils are generally metallic and are often used for special printing effects, such as for example, to print gold and purple metallic color details on feathers of an image of a peacock or to gild a name on a business card.

When foil printing an image, the transfer of a foil to only desired areas of the image requires that areas of the image that are not to be foil printed not stick to the foil when the printing foil bearing the foil is pressed to the image and heated. In many printing processes an image is printed on paper by depositing toners of appropriate colors on the paper and fusing the toners to the paper. Toners used to print an image are fused to paper similarly to the way that toner used as a foiling adhesive in a conventional foil printing process is bonded to a printed image. If a printing foil is pressed to an image printed with toners and heated, the toner melts and foil adheres to all printed areas of the image that contact the printing foil. When an image is printed with toners it is therefore not practical to foil print only parts of the image using conventional foil printing processes. It is certainly not practical to foil print only fine details of such an image, such as for example details of the feathers of the peacock image noted above.

SUMMARY OF THE INVENTION

An aspect of some preferred embodiments of the present invention relates to providing a method for foil printing selected areas of an image printed with toners.

An aspect of some preferred embodiments of the present invention relates to providing a foiling adhesive for foil printing the image that has a melting temperature that is less than the melting temperature of the toners used to print the image.

To foil print an image printed with the toners the foiling adhesive is printed on those areas of the image to which it is desired to apply a foil. A printing foil is pressed to the image and heated to a temperature that is above the melting temperature of the foiling adhesive and below the melting temperature of the toners. The foiling adhesive becomes tacky and sticks to the foil. The toners do not become tacky and do not stick to the foil because the temperature to which the printing foil is heated is below the melting temperature of the toners. When the printing foil is removed from the image, after cooling, foil is left only on those areas of the image printed with the foiling adhesive.

An aspect of some preferred embodiments of the present invention relates to providing a printing foil having its foil covered with a protective "non stick" layer that retards adhesion of the foil to the toners but not to the foiling adhesive when the printing foil is pressed to the image and heated.

In a preferred embodiment of the present invention, the foiling adhesive has a higher melting temperature than the toners used to print the image. When the printing foil is pressed to the image and heated to a temperature above the melting temperature of the adhesive its foil sticks to the adhesive but not to the toners. During heating of the printing foil, heat from the foil softens the toners. Preferably, the toners are highly viscous at the melting temperature of the adhesive so that the toners do not flow during the foil printing process.

There is therefore provided in accordance with a preferred embodiment of the present invention a method for producing a printed image having a region that is foil printed comprising: printing at least one region of the image with a toner; printing the region of the image to be foil printed with a foiling adhesive that sticks to a foil on a printing foil, which adhesive has a melting temperature lower than the melting temperature of the toner; and pressing the printing foil to the image and heating the printing foil to a temperature greater than the melting temperature of the foiling adhesive and less than the melting temperature of the toner.

Preferably, the toner comprises a material from the group of materials consisting of ethylene methacrylic acid copolymer and ionomers of ethylene methacrylic acid copolymer. In some preferred embodiments of the present invention the toner comprises ethylene methacrylic acid copolymer. In some preferred embodiments of the present invention the toner comprises an ionomer of ethylene methacrylic acid copolymer.

Alternatively or additionally the adhesive comprises a material chosen from the group of materials consisting of: ethylene acrylic ester maleic anhydride terpolymer; low molecular weight ethylene acrylic acid copolymer; ionomers of low molecular weight ethylene acrylic acid copolymer; and esters of ethylene acrylic acid copolymer.

In some preferred embodiments of the present invention the adhesive comprises ethylene acrylic ester maleic anhydride terpolymer. In some preferred embodiments of the present invention the adhesive comprises low molecular weight ethylene acrylic acid copolymer. In some preferred embodiments of the present invention the adhesive comprises an ionomer of low molecular weight ethylene acrylic acid copolymer. In some preferred embodiments of the present invention the adhesive comprises an ester of ethylene acrylic acid copolymer.

There is further provided in accordance with a preferred embodiment of the present invention a method for producing a printed image having a region that is foil printed comprising: printing at least one region of the image with a toner; printing the region of the image to be foil printed with a foiling adhesive; covering a foil side of a printing foil with a layer of material that sticks to melted foiling adhesive but not to the toner; and pressing the printing foil to the image and heating the printing foil to a temperature greater than a tacking temperature of the foiling adhesive.

Preferably the layer of material that doesn't stick to toner comprises a material chosen from the group of materials consisting of: methacrylic copolymer resin; polyester; polyvinyl chloride; and polycarbonate.

In some preferred embodiments of the present invention the non-stick layer comprises methacrylic copolymer resin. In some preferred embodiments of the present invention the non-stick layer comprises polyester. In some preferred embodiments of the present invention the non-stick layer comprises polyvinyl chloride. In some preferred embodiments of the present invention the non-stick layer comprises polycarbonate.

Additionally or alternatively the toner comprises a material chosen from the group of materials consisting of: ethylene methacrylic acid copolymer and ionomers of ethylene methacrylic acid copolymer; low molecular weight ethylene acrylic acid copolymer and ionomers of low molecular weight ethylene acrylic acid copolymer, esters of ethylene methacrylic acid; and esters of ethylene acrylic acid.

In some preferred embodiments of the present invention the toner comprises ethylene methacrylic acid copolymer. In some preferred embodiments of the present invention the toner comprises ionomer of ethylene methacrylic acid copolymer. In some preferred embodiments of the present invention the toner comprises low molecular weight ethylene acrylic acid copolymer. In some preferred embodiments of the present invention the toner comprises an ionomer of a low molecular weight ethylene acrylic acid copolymer. In some preferred embodiments of the present invention the toner comprises an ester of ethylene methacrylic acid. In some preferred embodiments of the present invention the toner comprises an ester of ethylene acrylic acid.

Additionally or alternatively, the adhesive comprises a material chosen from the group of materials consisting of styrene acrylic acid copolymer; polyamide; ethylene acrylic ester maleic anhydride terpolymer. In some preferred embodiments of the present invention the adhesive comprises styrene acrylic acid copolymer. In some preferred embodiments of the present invention the adhesive comprises polyamide. In some preferred embodiments of the present invention the adhesive comprises ethylene acrylic ester maleic anhydride terpolymer.

There is further provided in accordance with a preferred embodiment of the present invention a printing foil for foil printing a region of an image comprising: a substrate; a layer of foil bonded to the substrate; and a layer covering the foil formed from a material chosen from the group of materials consisting of methacrylic copolymer resin, polyester, polycarbonate and polyvinyl chloride.

In some preferred embodiments of the present invention the layer covering the foil comprises methacrylic copolymer resin. In some preferred embodiments of the present invention the layer covering the foil comprises a polyester. In some preferred embodiments of the present invention the layer covering the foil comprises polycarbonate. In some preferred embodiments of the present invention the layer covering the foil comprises polyvinyl chloride.

BRIEF DESCRIPTION OF FIGURES

The invention will be more clearly understood from the following description of preferred embodiments thereof read with reference to figures attached hereto. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DESCRIPTION OF PREFERRED EMBODIMENTS

Figure 1:
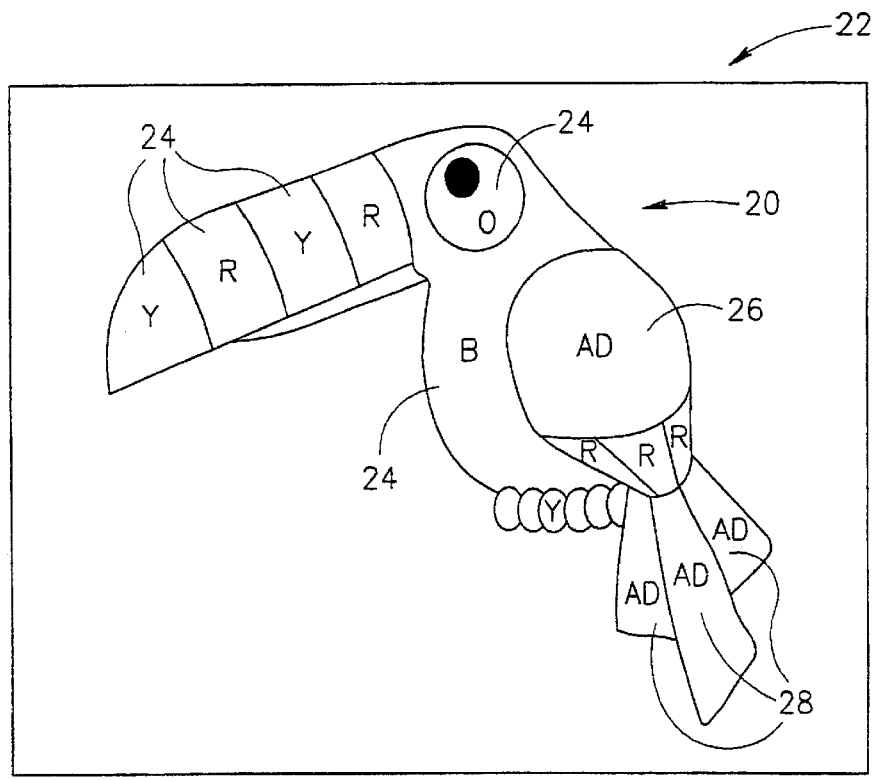
FIG. 1 shows a schematic image of a parrot printed using toners that is to have its wings and tail feathers foil printed with an iridescent green metallic color, in accordance with a preferred embodiment of the present invention.

FIG. 1 schematically shows an image of a parrot 20 printed on paper 22 with toners that is to be foil printed in accordance with a preferred embodiment of the present invention. The image of parrot 20 is partitioned into various bounded color regions 24. A letter in a bounded color region 24 represents a particular color toner with which the region is printed. For example, the letters Y, R, B, O shown in FIG. 1 might represent bright yellow, red, blue and orange toner respectively. The toners have a melting temperature $T_1$. A shoulder feather color region 26 and tail feather color regions 28, are to be foil printed with an iridescent metallic green and are printed, in a preferred embodiment of the invention, with a foiling adhesive which is represented by the letters AD, having a melting temperature $T_2$, which is less than $T_1$.

In a preferred embodiment of the present invention toners are liquid toners such as those described in U.S. Pat. No. 5,407,771 to Landa et al. Preferably, the toners comprise ethylene methacrylic acid copolymer made by Du Pont and sold under the trade name Nucrel 699. Nucrel 699 has a melting temperature $T_1$ between about 110° C.–120° C. Preferably the toners are toners produced and sold by Indigo N. V. of the Netherlands under the trade names EI-Mark 3.0 and EI-Mark 3.1 Other toners suitable for use with the present invention are based on: ethylene methacrylic acid low copolymers sold by Du Pont under the trade names NUCREL resins 599 and 925 and their ionomers, sold by Du Pont under the trade name SURLYN. Esters of these materials can also be used.

Preferably, a foiling adhesive used with these toners that has a melting temperature less than the toners comprises ethylene acrylic ester maleic anhydride terpolymer, manufactured by ELF Atochem and sold under the trade name Lotader 8200. Lotader 8200 has a melting temperature $T_2$ of about 1000° C.

To prepare a quantity of the foiling adhesive, 1800 g of Isopar-L made by Exxon and 1200 g of Lotader 8200 is loaded into a four gallon size Ross double planetary mixer that is preheated to about 140° C. The stirring speed of the mixer is set to stirring speed 6 and the loaded materials are stirred for about 1.5 hours until the mixture reaches a temperature of about 118° C. When the mixture reaches about 118° C. the stirring speed is reduced to stirring speed 3 and the mixture is air fan cooled for about three hours until the mixture temperature reaches about 40° C. 1150 g of the mixture, 2.3 g of aluminum stearate (mfg. by Riedel de Haen) and 1147.7 g Isopar-L are then ground together at 250 rpm in a 1S attritor (mfg. by Union Process) loaded with 3/16" carbon steel balls for about 26 hours at 40° C. The ground mixture is dispersed in a non-polar liquid such as an Isopar-L with a ratio by weight of mixture to dispersant of about 4% to provide the foiling adhesive.

Foiling adhesive can also be prepared, in accordance with a preferred embodiment of the present invention, using a procedure similar to that described above in which Lotader 8200 is replaced with Lotader 5500 or Lotader 6200/5500. Adhesives suitable for use in the present invention can also be similarly produced using ethylene acrylic acid low molecular weight copolymers AC 540 and AC 5120 (Allied Signal) or their low molecular weight ionomers AC 293 or 295 (Allied Signal), ethylene methacrylic acid (ester); and esters of ethylene acrylic acid copolymers.

Figure 2:
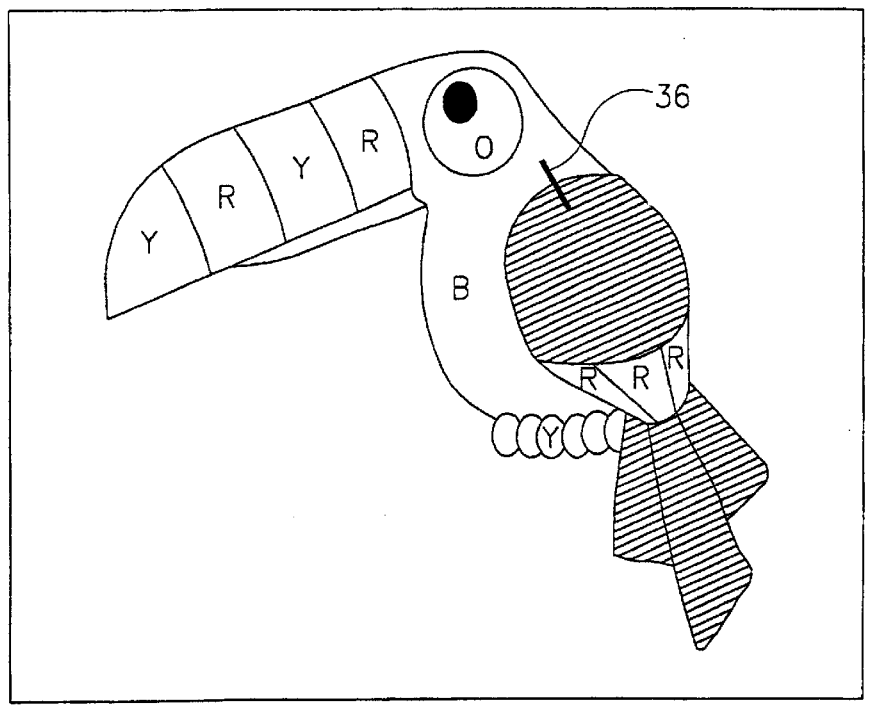
FIG. 2 schematically shows the parrot shown in FIG. 1 after foil printing in accordance with a preferred embodiment of the present invention.

To foil print iridescent green on shoulder and tail feather regions 26 and 28, a printing foil (not shown) having an iridescent green foil is pressed to the image of parrot 20 and heated to a temperature $T_3$, which satisfies the relationship $T_2 < T_3 < T_1$, using methods known in the art. At temperature $T_3$, foiling adhesive AD printed in shoulder and tail feather regions 26 and 28 melts and sticks to the iridescent green color on the printing foil. Toners, which having a melting temperature $T_1 > T_3$, do not melt and therefore do not stick to the iridescent green foil. When the printing foil is removed from the image of parrot 20, the iridescent green color covers substantially only shoulder and tail feather regions 26 and 28. FIG. 2 schematically shows the image of parrot 20 shown in FIG. 1 after foil printing, in accordance with a preferred embodiment of the present invention. The iridescent green is represented by shading and covers only shoulder and tail feather regions 26 and 28.

Figure 3A:
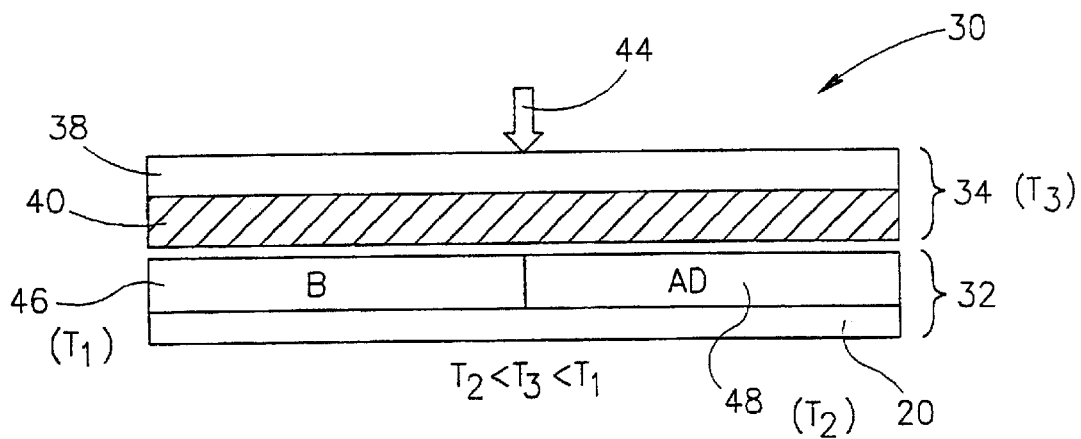
FIGS. 3A and 3B show schematically in cross section view foil printing the parrot shown in FIGS. 1 and 2, in accordance with a preferred embodiment of the present invention.

FIG. 3A schematically shows a cross section 30 of a portion 32 of the image of parrot 20 being foil printed with iridescent green using a printing foil 34, in accordance with preferred embodiment of the present invention. The cross section is taken along a bold line 36 shown in FIG. 2. Printing foil 34 preferably comprises a thin substrate 38 on which a layer 40 of iridescent green foil is deposited using methods known in the art. A block arrow 44 schematically represents a pressure with which printing foil 34 is pressed to image portion 32. Printing foil 34 is heated to a temperature $T_3$ shown in parentheses besides the numeral 34.

Figure 3B:
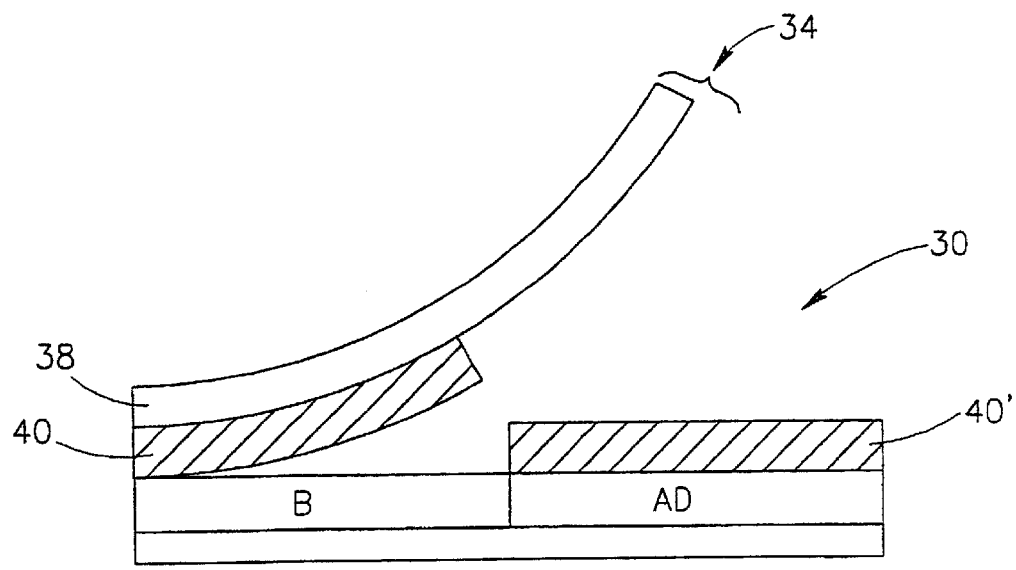

Image portion 32 of parrot 20 comprises a region 46 of paper 20 on which parrot 20 is printed, which is printed with toner B, and a region 48, which is printed with adhesive AD, in accordance with a preferred embodiment of the present invention. Toner B has a melting temperature $T_1$ (which is greater than $T_3$) shown in parentheses besides numeral 46. Adhesive AD has a melting temperature $T_2$ (which is less than $T_3$) shown in parentheses besides numeral 48. FIG. 3B schematically shows printing foil 34 partially removed from image portion 32 of parrot 20 following transfer of foil to image portion 32. A portion 40' of foil layer 40 that was pressed to foiling adhesive AD has separated from printing foil substrate 38 and is bonded to foiling adhesive AD. Substantially no foil is bonded to toner B, in accordance with a preferred embodiment of the present invention.

Parrot 20 can also be foil printed using a printing foil having its foil covered with a nonstick layer that prevents adhesion of the foil to the toners, in accordance with a preferred embodiment of the present invention, even if adhesive AD has a higher melting temperature than the toners. Preferably, the foiling adhesive AD is applied to shoulder feather color region 26 and tail feather color regions 28 in a dry xerography process. Preferably the adhesive is styrene acrylic acid copolymer, which has a melting temperature of about 160° C. This may be in the form of a powder toner or a liquid toner. When in powder form, preferably the powder is a colorless powder prepared by methods known in the art. Other adhesives suitable for use in the present invention can also be formed using a polyamide or Lotader 5500, 6200/5500 or 8200 as described above.

Preferably, a non-stick layer that adheres to the adhesive but retards adhesion of a foil to the toners in the image is formed from one of the family of methacrylic copolymer resins made by Du Pont that are sold under the trade names Elvacite 2014, 2016, 2043 and 2044. Non stick layers in accordance with preferred embodiments of the present invention can also be formed using polyesters, polycarbonate and polyvinyl chloride.

At a working temperature, preferably marginally greater than about 160° C. when for example styrene acrylic acid copolymer is used as an adhesive, to which a foil is heated to transfer foil to regions 26 and 28, toners printed in color regions 24 melt. However, at the working temperature the toners are viscous and do not flow substantially during the time that foil is being transferred from the printing foil to shoulder feather region 26 and tail feather regions 28. As a result, the heat and pressure to which the image of the parrot is subjected during the foil printing process do not substantially degrade the quality of the image.

Toners printed in color regions 24 that may be used with the non-stick layer, in accordance with a preferred embodiment of the present invention are toners based on Nucrel 699, such as Indigo N. V. toners EI-Mark 3.0 and EI-Mark 3.1 referenced above. Other toners suitable for use with the present invention are based on: ethylene methacrylic acid copolymers (sold by Du Pont under the trade names NUCREL resins 599 and 925) and their ionomers (sold by Du Pont under the trade name SURLYN); low molecular weight ethylene acrylic acid copolymers (trade names AC540 and AC 5120 by Allied Signal Inc.) and their ionomers (trade names ACRYN 293 and 295 by Allied Signal Inc); and esters of these materials.

Figure 4A:
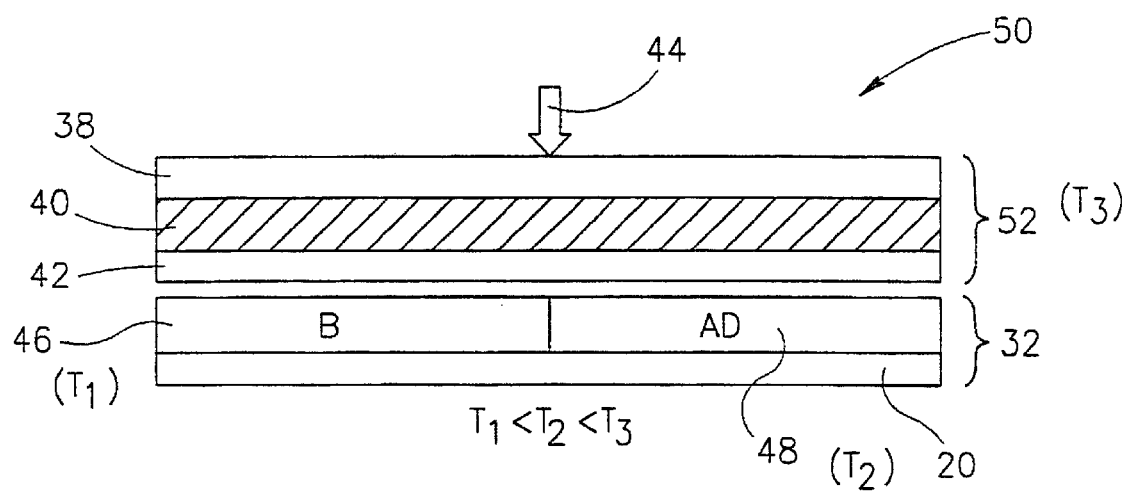
FIGS. 4A and 4B show schematically in cross section view foil printing the parrot shown in FIGS. 1 and 2, in accordance with another preferred embodiment of the present invention.
Figure 4B:
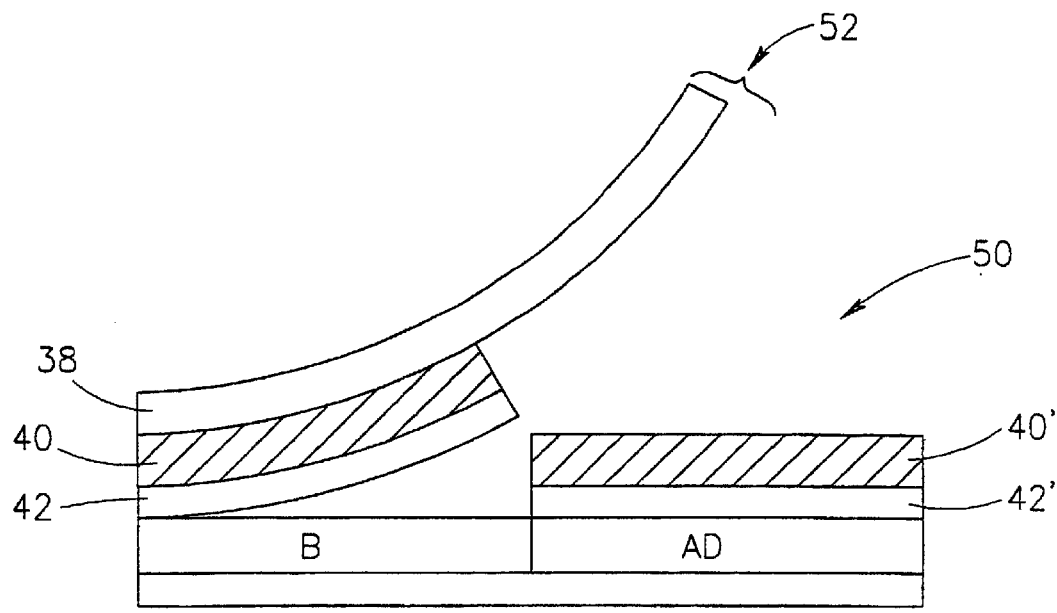

FIGS. 4A and 4B schematically show a cross section view 50 of portion 32, shown in FIGS. 3A and 3B, of the image of parrot 20 being foil printed with iridescent green using a printing foil 52 comprising a non-stick layer, in accordance with preferred embodiment of the present invention. In FIGS. 4A and 4B, unlike in FIGS. 3A and 3B, foiling adhesive AD, which covers region 48 of portion 32, has a melting temperature $T_2$ that is greater than the melting temperature $T_1$ of toner B, which covers region 46 of portion 32.

Printing foil 52 comprises a thin substrate 38 and a layer 40 of iridescent green foil. Foil layer 40 is covered with a layer 42 of non-stick material that does not stick to the toners used to print parrot 20, in accordance with a preferred embodiment of the present invention. A block arrow 44 schematically represents a pressure with which printing foil 52 is pressed to image portion 32. Printing foil is heated to a temperature $T_3$ that is greater, preferably marginally greater, than $T_2$. Temperatures $T_1$, $T_2$ and $T_3$ therefore satisfy the relationship $T_1 < T_2 < T_3$. At temperature $T_3$ toner B softens and melts but does not stick to non-stick layer 42. Furthermore, at temperature $T_3$, the viscosity of toner B is sufficiently high so that during the foil printing process toner B does not flow substantially.

FIG. 4B schematically shows printing foil 52 partially removed from portion 32 of parrot 20 following transfer of foil to image portion 32. A portion 42' of non-stick layer 42 that was pressed to foiling adhesive AD is bonded to adhesive AD and has "carried with it" a portion 40' of foil layer 40, which has separated from printing foil substrate 38. Substantially no portion of non-stick layer 42 and therefore of foil layer 40 is bonded to toner B, in accordance with a preferred embodiment of the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of preferred embodiments thereof that are provided by way of example and are not intended to limit the scope of the invention. The described preferred embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for producing a printed image having a region that is foil printed comprising:
   printing at least one region of the image with a toner;
   printing the region of the image to be foil printed with a foiling adhesive that sticks to a foil on a printing foil, which adhesive has a melting temperature lower than the melting temperature of the toner; and
   pressing the printing foil to the image and heating the printing foil to a temperature greater than the melting temperature of the foiling adhesive and less than the melting temperature of the toner.

2. A method according to claim 1 wherein the toner comprises a material from the group of materials consisting of ethylene methacrylic acid copolymer and ionomers of ethylene methacrylic acid copolymer.

3. A method according to claim 2 wherein the toner comprises ethylene methacrylic acid copolymer.

4. A method according to claim 2 wherein the toner comprises an ionomer of ethylene methacrylic acid copolymer.

5. A method according to claim 1 wherein the adhesive comprises a material chosen from the group of materials consisting of: ethylene acrylic ester maleic anhydride terpolymer; low molecular weight ethylene acrylic acid copolymer; ionomers of low molecular weight ethylene acrylic acid copolymer; and esters of ethylene acrylic acid copolymer.

6. A method according to claim 5 wherein the adhesive comprises ethylene acrylic ester maleic anhydride terpolymer.

7. A method according to claim 5 wherein the adhesive comprises low molecular weight ethylene acrylic acid copolymer.

8. A method according to claim 5 wherein the adhesive comprises an ionomer of low molecular weight ethylene acrylic acid copolymer.

9. A method according to claim 5 wherein the adhesive comprises an ester of ethylene acrylic acid copolymer.

10. A method for producing a printed image having a region that is foil printed comprising:
    printing at least one region of the image with a toner;
    printing the region of the image to be foil printed with a foiling adhesive;
    covering a foil side of a printing foil with a layer of material that sticks to melted foiling adhesive but not to the toner; and
    pressing the printing foil to the image and heating the printing foil to a temperature greater than a tacking temperature of the foiling adhesive.

11. A method according to claim 10 wherein the layer of material that doesn't stick to the toner comprises a material chosen from the group of materials consisting of: methacrylic copolymer resin; polyester; polyvinyl chloride; and polycarbonate.

12. A method according to claim 11 wherein the non-stick layer comprises methacrylic copolymer resin.

13. A method according to claim 11 wherein the non-stick layer comprises polyester.

14. A method according to claim 11 wherein the non-stick layer comprises polyvinyl chloride.

15. A method according to claim 11 wherein the non-stick layer comprises polycarbonate.

16. A method according to claim 10 wherein the toner comprises a material chosen from the group of materials consisting of: ethylene methacrylic acid copolymer and ionomers of ethylene methacrylic acid copolymer; low molecular weight ethylene acrylic acid copolymer and ionomers of low molecular weight ethylene acrylic acid copolymer; esters of ethylene methacrylic acid; and esters of ethylene acrylic acid.

17. A method according to claim 16 wherein the toner comprises ethylene methacrylic acid copolymer.

18. A method according to claim 16 wherein the toner comprises an ionomer of ethylene methacrylic acid copolymer.

19. A method according to claim 16 wherein the toner comprises low molecular weight ethylene acrylic acid copolymer.

20. A method according to claim 16 wherein the toner comprises an ionomer of low molecular weight ethylene acrylic acid copolymer.

21. A method according to claim 16 wherein the toner comprises an ester of ethylene methacrylic acid.

22. A method according to claim 16 wherein the toner comprises an ester of ethylene acrylic acid.

23. A method according to claim 10 wherein the adhesive comprises a material chosen from the group of materials consisting of: styrene acrylic acid copolymer; polyamide; and ethylene acrylic ester maleic anhydride terpolymer.

24. A method according to claim 23 wherein the adhesive comprises styrene acrylic acid copolymer.

25. A method according to claim 23 wherein the adhesive comprises polyamide.

26. A method according to claim 23 wherein the adhesive comprises ethylene acrylic ester maleic anhydride terpolymer.

* * * * *

UNITED STATES PATENT AND TRADEMARK OFFICE
CERTIFICATE OF CORRECTION

PATENT NO.   : 6,605,174 B1
DATED        : August 12, 2003
INVENTOR(S)  : Benzion Landa et al.

It is certified that error appears in the above-identified patent and that said Letters Patent is hereby corrected as shown below:

<u>Title page,</u>
Item [22], PCT Filed, change "February 9, 2000" to -- January 9, 2000 --

Signed and Sealed this

Second Day of March, 2004

JON W. DUDAS
*Acting Director of the United States Patent and Trademark Office*